United States Patent [19]

Mizuno et al.

[11] Patent Number: 5,695,390

[45] Date of Patent: Dec. 9, 1997

[54] FINISHING MACHINES FOR INTERNAL SPLINE TOOTH SURFACES

[75] Inventors: Sadao Mizuno, Nagoya; Akinori Hoshino, Toyota; Tetsuya Morita, Gamagori, all of Japan

[73] Assignee: Aisin Seiki Kabushiki Kaisha, Kariya, Japan

[21] Appl. No.: 430,489

[22] Filed: Apr. 28, 1995

[30] Foreign Application Priority Data

Apr. 30, 1994 [JP] Japan ................... 6-113993

[51] Int. Cl.$^6$ ........................................... B24B 5/40
[52] U.S. Cl. .................. 451/124; 451/143; 451/164; 451/165; 451/246; 451/478
[58] Field of Search ..................... 451/47, 51, 121, 451/123, 140, 124, 143, 164, 165, 246, 470, 478

[56] References Cited

U.S. PATENT DOCUMENTS

| | | |
|---|---|---|
| 1,486,340 | 3/1924 | Hoke ........................ 451/47 |
| 1,988,025 | 1/1935 | Trendell . | 
| 2,257,195 | 9/1941 | Rovick ...................... 451/47 |
| 2,765,529 | 10/1956 | Bolender . |
| 2,939,250 | 6/1960 | Kline ..................... 451/165 X |
| 3,161,992 | 12/1964 | Gentry et al. ............. 451/124 |
| 3,705,619 | 12/1972 | Holm ........................ 451/47 |
| 4,462,189 | 7/1984 | Puybaraud ................ 451/470 |
| 4,559,744 | 12/1985 | Wirz ......................... 51/287 |
| 4,621,457 | 11/1986 | Moyer ...................... 451/164 |
| 5,305,556 | 4/1994 | Kopp et al. .............. 451/165 |

FOREIGN PATENT DOCUMENTS 28 14 676 10/1979 Germany .
31 50 961 9/1982 Germany .

OTHER PUBLICATIONS

"Handbuch der Fertigungstechnik", edition 3/2 Carl Hanser Verlag, München 1980, p. 297, figure 5E.
*Journal of the Society of Automotive Engineers of Japan*, vol. 46, No. 6, 1992, pp. 100–104.

Primary Examiner—Timothy V. Eley
Attorney, Agent, or Firm—Burns, Doane, Swecker & Mathis, LLP

[57] ABSTRACT

A finishing machine for internal spline tooth surfaces which comprises a holding device for holding a work having the internal spline tooth surfaces, a grinding stone having a plurality of tooth portions for simultaneously processing a plurality of tooth portions in the work, and a vibrating device for vibrating the grinding stone with a high speed in the axial direction of the work.

10 Claims, 8 Drawing Sheets

FINISHING MACHINES FOR INTERNAL SPLINE TOOTH SURFACES

BACKGROUND OF THE INVENTION

1. Field of the Invention

The present invention relates to a finishing machine for internal spline tooth surfaces which provides a high speed vibration of a grinding stone in the axial direction of a work and simultaneously grinds a plurality of tooth portions in the work by a plurality of tooth portions in the grinding stone.

2. Description of the Prior Art

In a prior art, finishing machine for internal spline tooth surfaces includes a small wheel grinding stone G at the top of a spindle S allowing a rotating and conveying mechanism to intervene in an interior thereof as shown in FIGS. 8 and 9 and sequentially grinds each tooth space of the internal spline tooth surfaces of a work W one by one by using an index device.

For molding the entire teeth of the internal spline tooth surfaces in the work by using the conventional finishing machine for internal spline tooth surfaces, it was necessary to make an index rotation of the work only for the increment in the number of the tooth portions by the index device and there was the problem that the resulting cycle time becomes very long. As the accuracy in pitch became therefor greater so as to create possible errors, problems arose in that an expensive index device was required and this made the facilities more expensive. Also as the spindle described above took a cantilever structure, such a device as used in a miniature work had a low rigidity as well as a poor accuracy.

SUMMARY OF THE INVENTION

It is a general object of the invention to shorten a cycle time in a finishing machine for internal spline tooth surfaces. It is a more specific object of the invention to maintain a high pitch accuracy by using an inexpensive device in a finishing machine for internal spline tooth surfaces.

It is a more specific object of the invention to maintain a high rigidity and a high accuracy in a finishing machine for internal spline tooth surfaces.

It is another object of the invention to provide a finishing machine for internal spline tooth surfaces on the basis of a first technical idea of the invention for grinding simultaneously a plurality of tooth portions in a work by providing a high speed vibration in the axial direction of a work and by means of a plurality of tooth portions in a grinding stone.

It is still another object of the invention to provide a finishing machine for internal spline tooth surfaces on the basis of a second technical idea of the invention for expanding outwardly a plurality of tooth portions in a grinding stone in a radial direction thereof and grinding a plurality of tooth portions in the work.

It is a further object of the invention to provide a finishing machine for internal spline tooth surfaces which comprises a holding device for holding a work having internal spline tooth surfaces, a grinding stone having a plurality of tooth portions for simultaneously grinding the internal spine tooth surfaces in the work, and a vibrating device for vibrating the grinding stone with a high speed in the axial direction of the work.

It is a still further object of the invention to provide a finishing machine for internal spline tooth surfaces which comprises an expanding mechanism for outwardly expanding the tooth portions in the grinding stone in a radial direction thereof.

It is a still further object of the invention to provide a finishing machine for internal spline tooth surfaces which comprises a rotating device for rotating the grinding stone with a rotating force and a braking device for braking the work with a brake force.

It is a yet further object of the invention to provide a finishing machine for internal spline tooth surfaces which comprises a work pressing device for pressing a work onto the grinding stone.

It is another object of the invention to provide a finishing machine for internal spline tooth surfaces which comprises a rotating direction control device for controlling a rotating direction of the rotating device.

It is a further object of the invention to provide a finishing machine for internal spline tooth surfaces wherein the grinding stone comprises the tooth portions having a smaller number than that of the tooth portions in the work.

It is a still further object of the invention to provide a finishing machine for internal spline tooth surfaces wherein the grinding stone comprises the tooth portions having the same number with that of the tooth portions in the grinding stone.

It is a yet further object of the invention to provide a finishing machine for internal spline tooth surfaces wherein the grinding stone is provided at the center portion of an axis rotatably supported at both ends thereof.

The finishing machine for internal spline tooth surfaces of the invention having the structure described above is to grind simultaneously the tooth portions in the work having internal spline tooth surfaces held by the holding device by means of the tooth portions in the grinding stone vibrated with the high speed in the axial direction of the work by the vibrating device.

A finishing machine for internal spline tooth surfaces of the invention is to grind simultaneously the tooth portions in a work having internal spline tooth surfaces held by the holding device by means of the tooth portions in the grinding stone vibrated with the high speed vibration in the axial direction of the work by the vibrating device and also expanded outward in the radial direction thereof by using the expanding mechanism.

A finishing machine for internal spline tooth surfaces of the invention is to grind simultaneously the tooth portions in the work having internal spline tooth surfaces held by the holding device and also applied with the braking force by the braking device by means of the tooth portions in the grinding stone vibrated with a high speed in the axial direction of the work and also rotated with rotating force by the rotating device.

A finishing machine for internal spline tooth surfaces of the invention is to grind simultaneously the tooth portions in the work having internal spline tooth surfaces held by the holding device and also pressed onto the grinding stone by the work pressing device, by means of the tooth portions in the grinding stone vibrated with the high speed in the axial direction of the work by the rotating device and also rotated with the rotating force by the rotating device described above.

A finishing machine for internal spline tooth surfaces of the invention is to grind simultaneously the tooth portions in the work having internal spline tooth surfaces held by the holding device and also applied with the braking force by the braking device, by means of the tooth portions in the grinding stone vibrated with the high speed in the axial direction of the work by the rotating device and also rotated with normal and reversed directions by the rotating device and the rotating direction control device.

A finishing machine for internal spline tooth surfaces of the invention is to grind simultaneously the tooth portions in the work having internal spline tooth surfaces held by the holding device and also applied with the braking force by the braking device, by means of the tooth portions having a smaller number than that of the tooth portions of the work in the grinding stone vibrated with the high speed in the axial direction of the work by the rotating device and also rotated with the normal and reversed directions by the rotating device and the rotating direction control device.

A finishing machine for internal spline tooth surfaces of the invention is to grind simultaneously the tooth in the work having internal spline tooth surfaces held by the holding device and also applied with the braking force by the braking device, by means of the tooth portions having the same number with that of the tooth portions in the work in the grinding stone vibrated with the high speed in the axial direction of the work, also rotated with the normal and reversed directions by the rotating device and the rotating direction control device.

A finishing machine for internal spline tooth surfaces of the invention is to grind simultaneously the tooth portions in the work having internal spline tooth surfaces held by the holding device and also applied with the braking force by the braking device, by means of the tooth portions having the same number with that of the tooth portions in the work in the grinding stone vibrated with the high speed in the axial direction of the work by the rotating device and also rotated with the normal and reverse direction by the rotating device.

A finishing machine for internal spline tooth surfaces of the invention has the effect of shortening a cycle time thereof and maintaining a high pitch accuracy by using an inexpensive device, since the tooth portions in the work having internal spline tooth surfaces is simultaneously ground by the tooth portions in the grinding stone vibrated with a high speed in the axial direction of the work.

A finishing machine for internal spline tooth surfaces of the invention has the effect of making it possible to carry out finishing internal spline tooth surfaces effectively, since the tooth portions of the grinding stone is expanded outwardly in the radial direction thereof by the expanding mechanism described above.

A finishing machine for internal spline tooth surfaces of the invention has the effect of making it possible to carry out finishing internal spline tooth surfaces smoothly and uniformly, since the work applied with the braking force by the braking device is continuously ground while the grinding stone is rotated by the rotating device.

A finishing machine for internal spline tooth surfaces of the invention has the effect of making it possible to carry out finishing internal spline tooth surfaces smoothly and uniformly, since the work pressed onto the grinding stone by the work pressing device is continuously ground while rotating the grinding stone rotated to be driven by the rotating device.

A finishing machine for internal spline tooth surfaces of the invention has the effect of making it possible to carry out grinding the both surfaces of the tooth portions likewise, since the rotation of the grinding stone is made by changing over the rotation into a normal or reversed direction thereof.

A finishing machine for internal spline tooth surfaces of the invention has the effect of making it possible to carry out grinding internal spline tooth surfaces much more smoothly and uniformly, since the grind is made by the continuous gearing of the tooth portions in the work and the tooth portions having a smaller number than that of the tooth portions in the work in the grinding stone each other thereof.

A finishing machine for internal spline tooth surfaces of the invention has the effect of making it possible to carry out finishing internal spline tooth surfaces much more smoothly and uniformly, since a work is made a little by a little by engaging with the tooth portions in the work and the tooth portions having the same number with that of the tooth portions in the work in the grinding stone each other thereof.

A finishing machine for internal spline tooth surfaces of the invention has the effect of making it possible to maintain a high rigidity in processing and a high accuracy in processing, since the work is processed by the grinding stone provided at the center portion of the axis rotatably supported at the both ends thereof.

DETAILED DESCRIPTION OF PREFERRED EMBODIMENTS

Detailed description of the invention will be given with reference to the preferred embodiments, accompanying with the drawings in the following.

The First Preferred Embodiment

Figure 1:
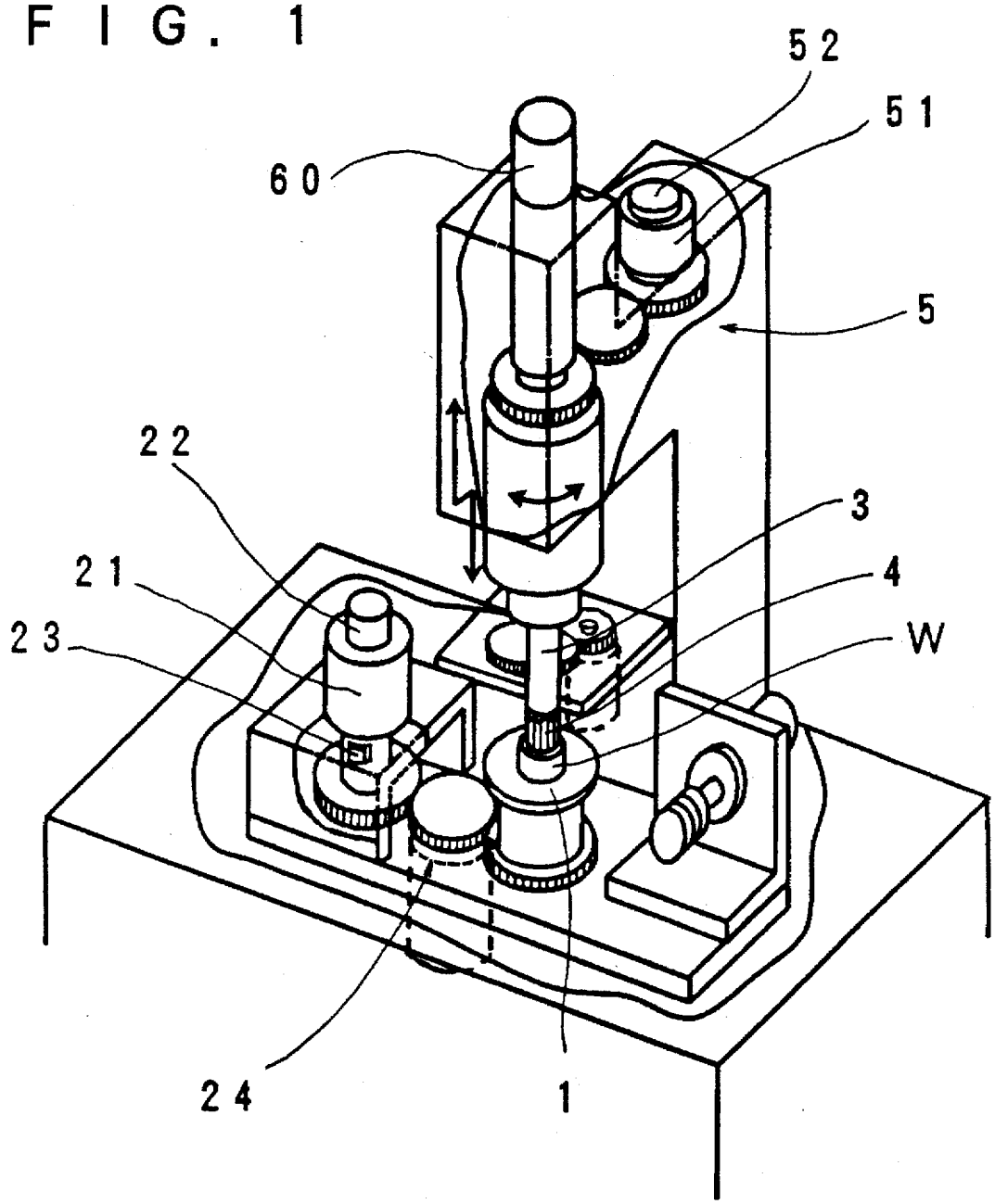
FIG. 1 is perspective view showing a finishing machine for internal spline tooth surfaces as a first preferred embodiment of the present invention.
Figure 2:
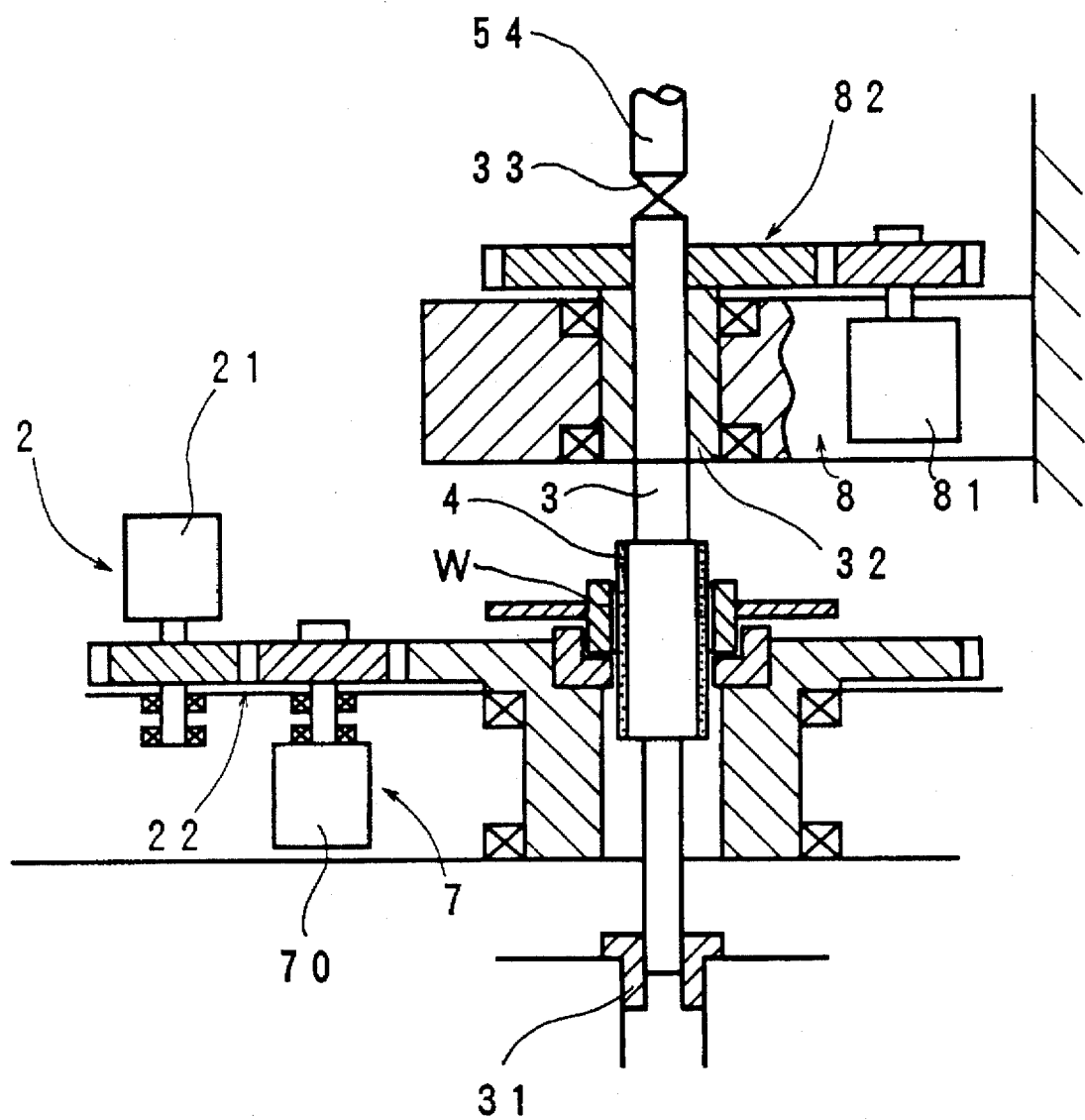
FIG. 2 is a partial sectional view showing a finishing machine internal spline tooth surfaces as a first preferred embodiment of the present invention.

As shown in FIGS. 1 and 2, a finishing machine for internal spline tooth surfaces as a first preferred embodiment of the invention comprises a holding device 1 for holding a work W having internal spline tooth surfaces; a braking device 2 provided with an electromagnetic brake 21 for attaching with a braking force to the work W; a grinding stone 4 having a plurality of tooth portions for simultaneously grinding a plurality of tooth portions in the work which are provided at the center portion of an axle 3 rotatably supported at both ends thereof and composed of the tooth portions having the same number with that of tooth portions in the work; a rotating and driving device 5 comprising a spindle motor 51 that function as a rotating force attaching device for attaching a rotating force to the grinding stone 4 and a rotating direction control device for controlling the rotating direction of the grinding stone 4; a vibrating device 6 for vibrating the grinding stone 4 with a high speed in an axial direction of the work W; a work positioning the work device 7 for positioning at the time of gearing, the work positioning device including a servomotor 70; and a grinding stone positioning device 8 for positioning the grinding stone 4 at a time of gearing, the positioning device 8 including a servomotor 81 and a gear mechanism 82. Incidentally, in order to finish the internal spline tooth surfaces smoothly and uniformly, a work pressing device (a pressed direction being indicated by a straight arrow in FIG. 5) may be also adapted so that for example, the rotating motion of a motor is converted into a linear motion by a ball screw and the work W is transferred in the left and right directions of FIG. 1 by the converted output and pressed onto the grinding stone 4, instead of using the braking device 2. Otherwise, the braking device 2 and the work pressing device may be both used as well.

As shown in FIGS. 1 and 2, the holding device 1 is rotatably provided coaxially with the axle 3 fixed to the grinding stone 4.

The braking device 2 comprises the electromagnetic brake 21 and a train of gearing 22 as shown in FIGS. 1 and 2 and applied to the work W with a predetermined braking force (rotating load) where the amount to be ground and the properties of the finished surface are taken into consideration.

Figure 3:
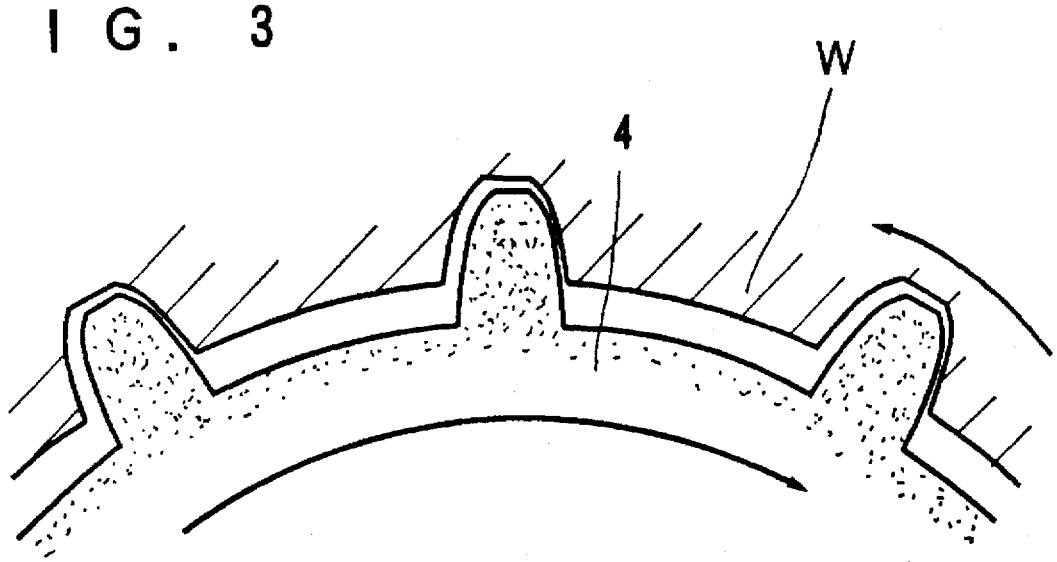
FIG. 3 is a partial sectional view showing a work and a grinding stone in the first preferred embodiment of the present invention.

The grinding stone 4 comprises an entire type grinding stone of the external spline type wherein the tooth portions are the same number as the tooth portions of the internal spline tooth surface formed in the internal surface of the work W as shown in FIG. 3. Tool guides 31 and 32 support the axle 3 at both ends thereof and the grinding stone is positioned at the center of the axle 3 which rotates and conveys with a gear box, which will be described later, through a universal joint 33 as shown in FIG. 2.

As shown in FIGS. 1 and 2, the rotating and driving device 5 comprises a spindle motor 51 and a train of gearing 52 for conveying a rotation to a rotational axle 54 which is transmitted the axle 3 through the universal joint 33 and rotates and drives the grinding stone 4 in the normal and reversed directions thereof at a predetermined rotational frequency.

As shown in FIGS. 1 and 2, the vibrating device 6 includes a piston inserted into a hydraulic cylinder 60 and mechanically connected to the axle of rotation 54 and a high speed up and down vibration (in the axial direction of the work W) is attachable to the grinding stone 4 by the switching control of the hydraulic pressure supplied into the hydraulic cylinder 60.

A finishing machine for internal spline tooth surfaces comprised of the above-described construction is vibrated with a high speed in the axial direction of the work W by the vibrating device 6, and is also rotated in the normal and reversed directions by the rotating and driving device 5 comprising the rotating force attaching device and the rotating direction control device. The membrane, provided with the tooth portions that are the same in number as the tooth portions in the work W, simultaneously inserts all of the tooth portions comprising the internal spline tooth surfaces in the work W held by the holding device 1 and is also applied with any rotating load by the braking device 2. The machine with the tooth portions in the grinding stone 4 that is provided at the center portion of the axle 3 rotatably supported by tool guides 31 and 32 at both ends thereof gives a contact surface pressure, resulting in generation of a grinding operation for processing.

In other words, when the grinding stone 4 is rotated to be driven in a certain direction thereof by the rotating and driving device 5 and a certain period of time has elapsed, the rotating and driving motion is made again in the reversed direction for a certain period of time in order to process both surfaces of the tooth portions in the work W by the grinding stone 4, and the processing is carried out repeatedly until the desired finishing process is completed. A finishing machine for internal spline tooth surfaces of the first preferred embodiment giving the operation described above has the effect of shortening the cycle time and maintaining a high pitch accuracy by an inexpensive device, since this finishing machine simultaneously processes all of the tooth portions in the work W having internal spline tooth surfaces by means of the tooth portions in the grinding stone 4 vibrated with a high speed in the axial direction of the work W, and simultaneously transfers the shape of the external spline type grinding stone to all of the tooth portions in the work W.

A finishing machine for internal spline tooth surfaces of the first preferred embodiment has the effect of making it possible to finish internal spline tooth surfaces smoothly and uniformly, since the grinding stone 4 rotatably driven by the rotating and driving device 5 continuously processes the work W applied by the braking device with a predetermined rotating load while rotating.

Further, a finishing machine for internal spline tooth surfaces of the first preferred embodiment has the effect of making it possible to finish both left and right tooth surfaces of the tooth portions likewise, since the rotation of the grinding stone 4 is changed over between normal and reversed rotation every certain period of time by the rotating and driving device 5 having the ability of the rotating direction control device.

Still further, a finishing machine for internal spline tooth surfaces of the first preferred embodiment has the effect of making it possible to finish internal spline tooth surfaces much more smoothly and uniformly, since the work W is gradually processed by inserting the tooth portions in the grinding stone 4 which are the same in number as the total number of tooth portions in the work W.

Furthermore, a finishing machine for internal spline tooth surfaces of the first preferred embodiment has the effect of making it possible to maintain a high processing rigidity and a high processing accuracy in comparison with those of the prior art having a cantilever constitution, since the work W is processed by the grinding stone 4 provided at the center portion of the axle 3 that is rotatably supported by the tool guides 31 and 32 at both ends thereof.

The Second Preferred Embodiment

Figure 4:
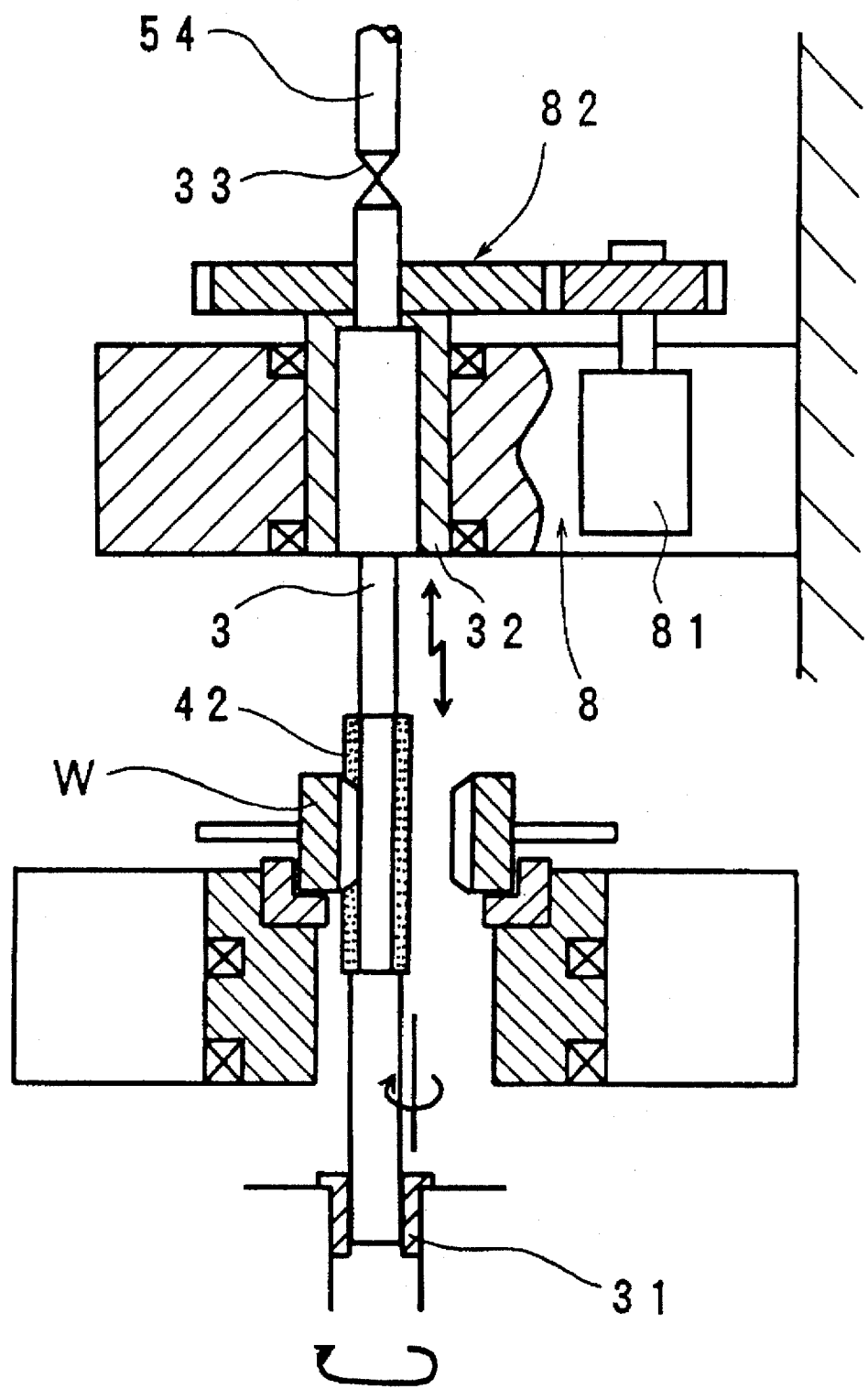
FIG. 4 is a partial sectional view showing a finishing machine internal spline tooth surfaces as a second preferred embodiment of the present invention.
Figure 5:
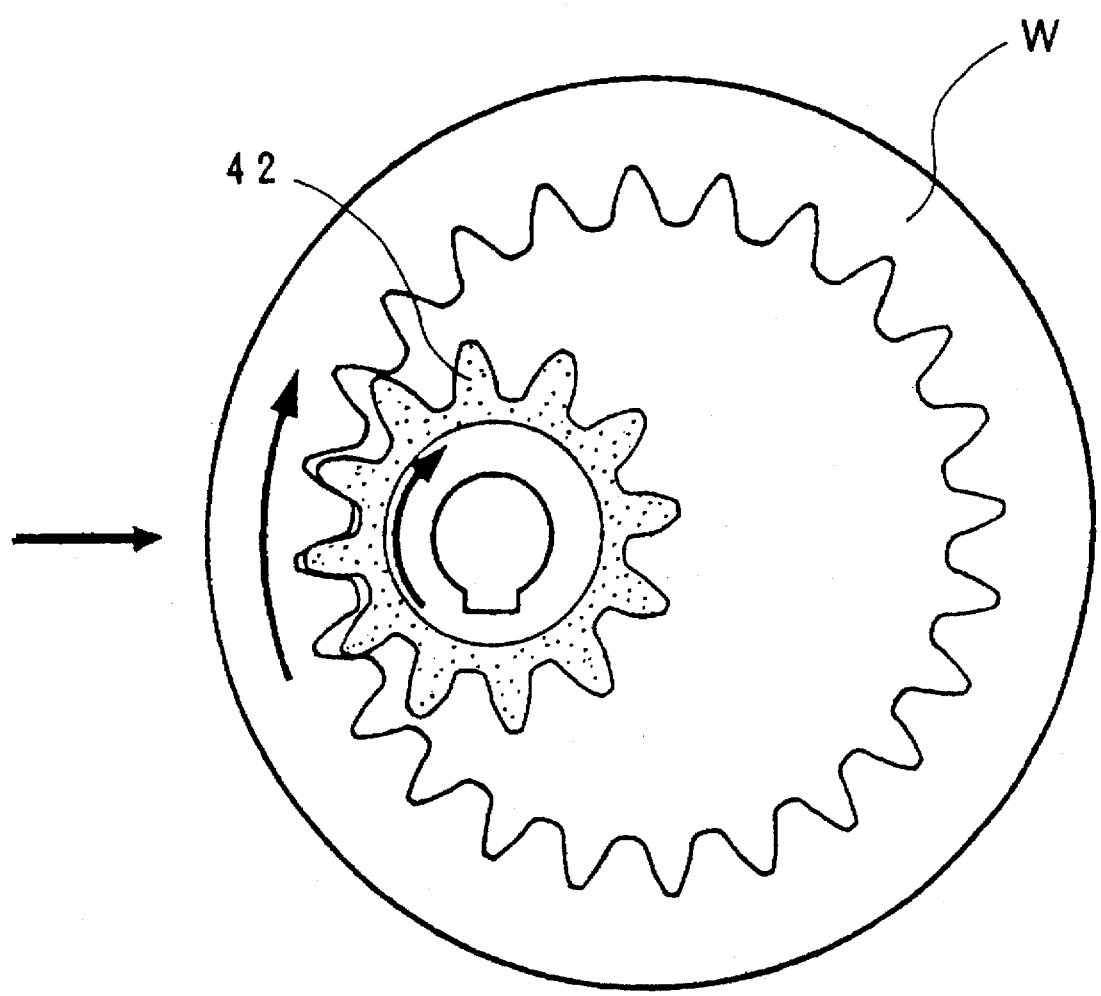
FIG. 5 is a sectional view showing a finishing machine for internal spline tooth surfaces as a second preferred embodiment of the present invention.

A finishing machine for internal spline tooth surfaces as a second preferred embodiment of the invention is different from the first preferred embodiment described above only in the point that the grinding stone 42 the tooth portions are smaller in number than the number (24T, 20T, e.g.,) of tooth portions in the work W, as shown in FIGS. 4 and 5.

A finishing machine for internal spline tooth surfaces having the above-mentioned constitution as a second preferred embodiment is derived to operate by simultaneously gearing the tooth portions comprising the internal spline tooth surfaces in the work W held by the holding device 1 and applied with the rotating load by the braking device 2, by means of the tooth portions of the grinding stone 42 vibrated with a high speed in the axial direction of the work W by the vibrating device 6. The axle 3 is rotated in the normal and reversed directions by the rotating and driving device 5 comprising the rotating force attaching device and the rotating direction control device. Additionally the tooth portions of the tooth portions having a smaller number than the tooth portions in the work W and the grinding stone is provided at the center portion of the axle 3 rotatably supported by the tool guides at both ends thereof.

A finishing machine for internal spline tooth surfaces having the above-mentioned operation as a second preferred embodiment has the effect, in addition to the similar effect as in the first preferred embodiment, of making it possible to finish internal spline surfaces much more smoothly and uniformly, since the process is carried out repeatedly depending on the rotations by the continuous gearing with the work W of the tooth portions in the grinding stone 42 composed of the tooth portions having a smaller number than that of the tooth portions in the work W.

The Third Preferred Embodiment

Figure 7:
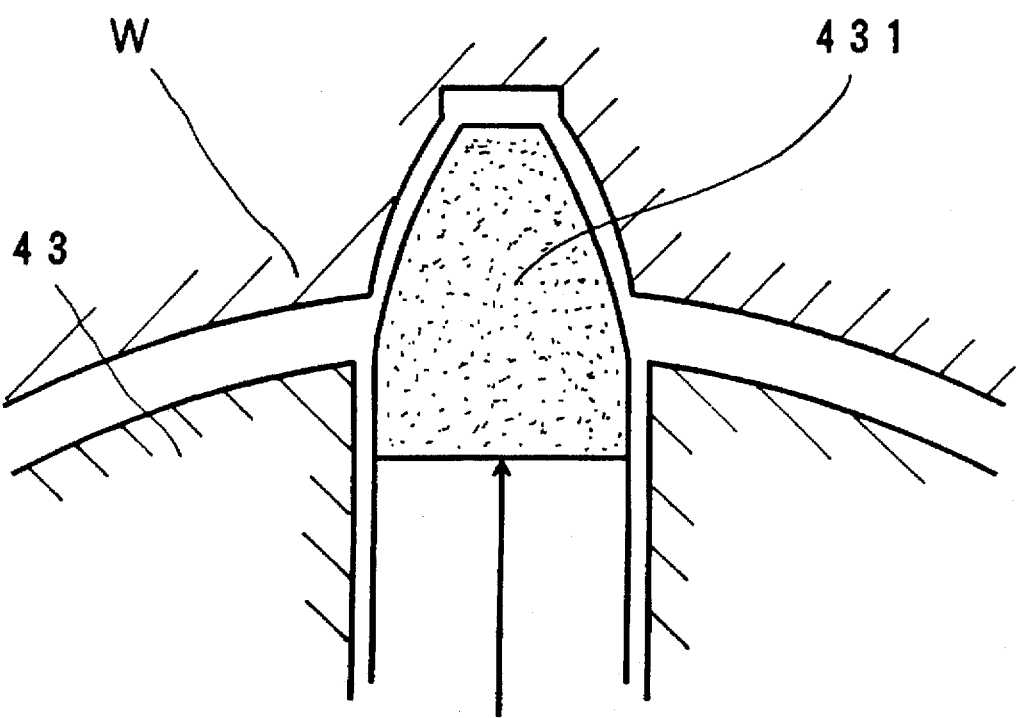
FIG. 7 is a sectional view showing a work and a grinding stone in the third preferred embodiment of the present invention.
Figure 6:
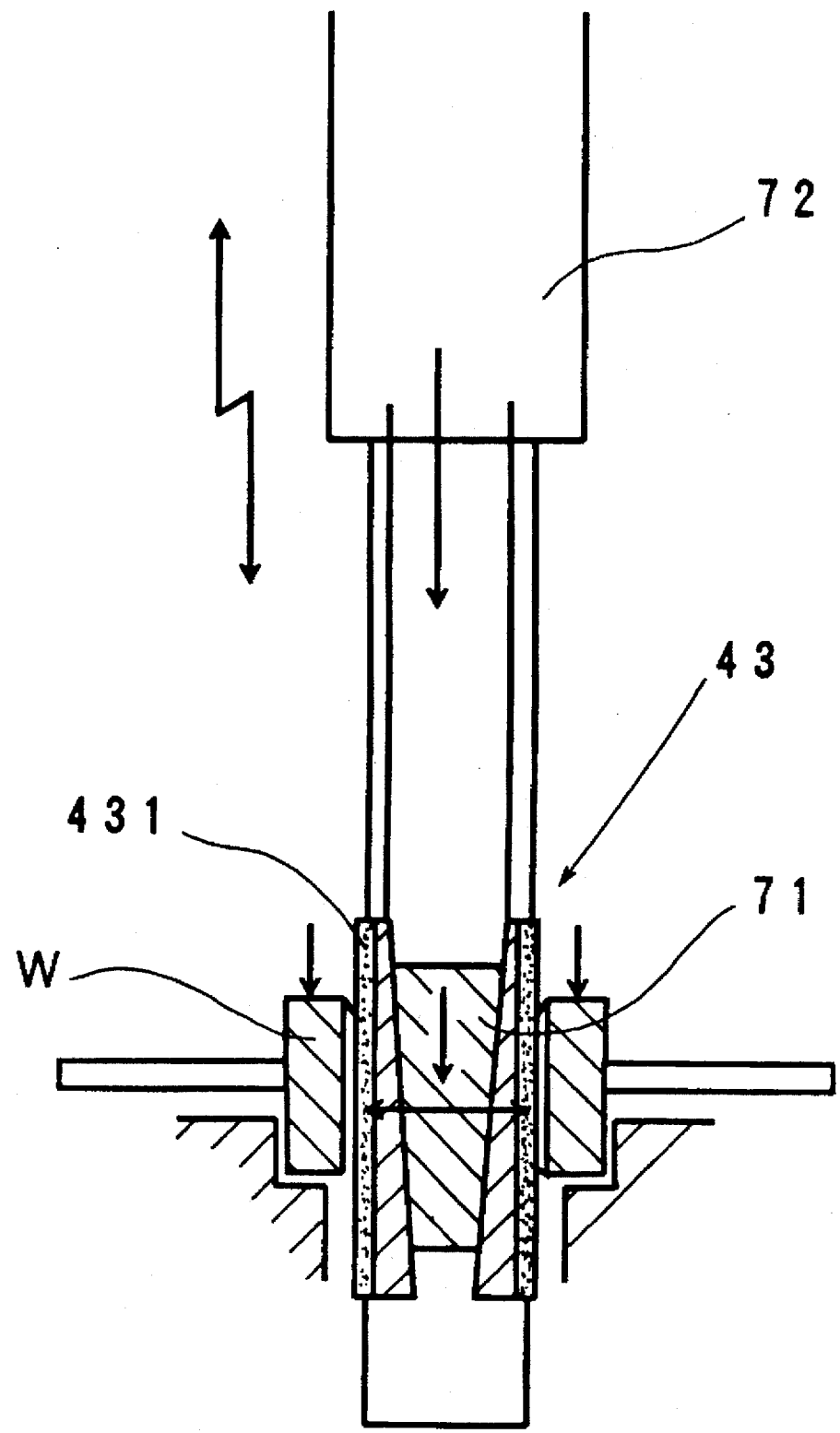
FIG. 6 is a partial sectional view showing a finishing machine for internal spline tooth surfaces as a third preferred embodiment of the present invention.
Figure 8:
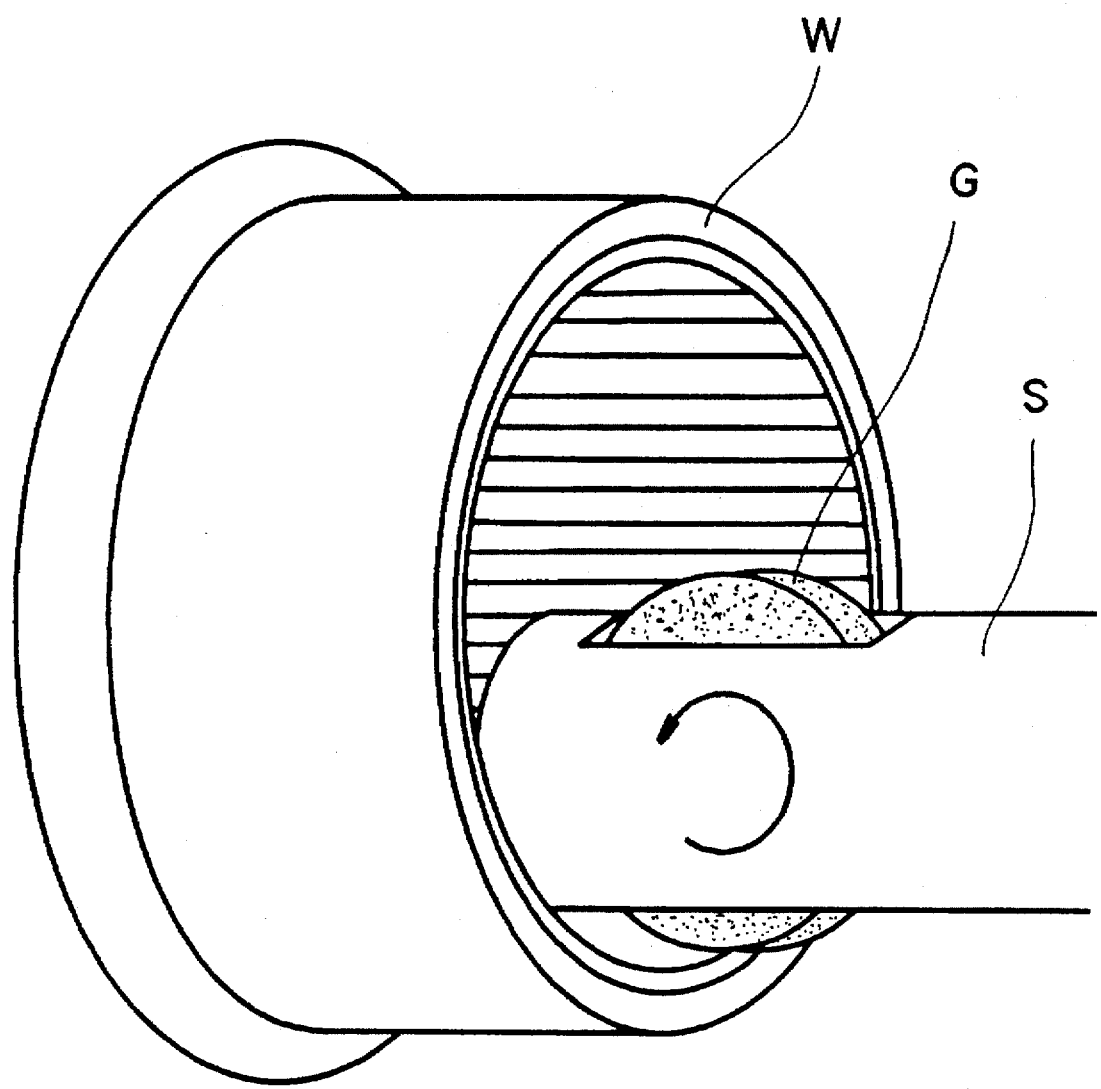
FIG. 8 is a perspective view showing a prior art finishing machine for internal spline tooth surfaces.
Figure 9:
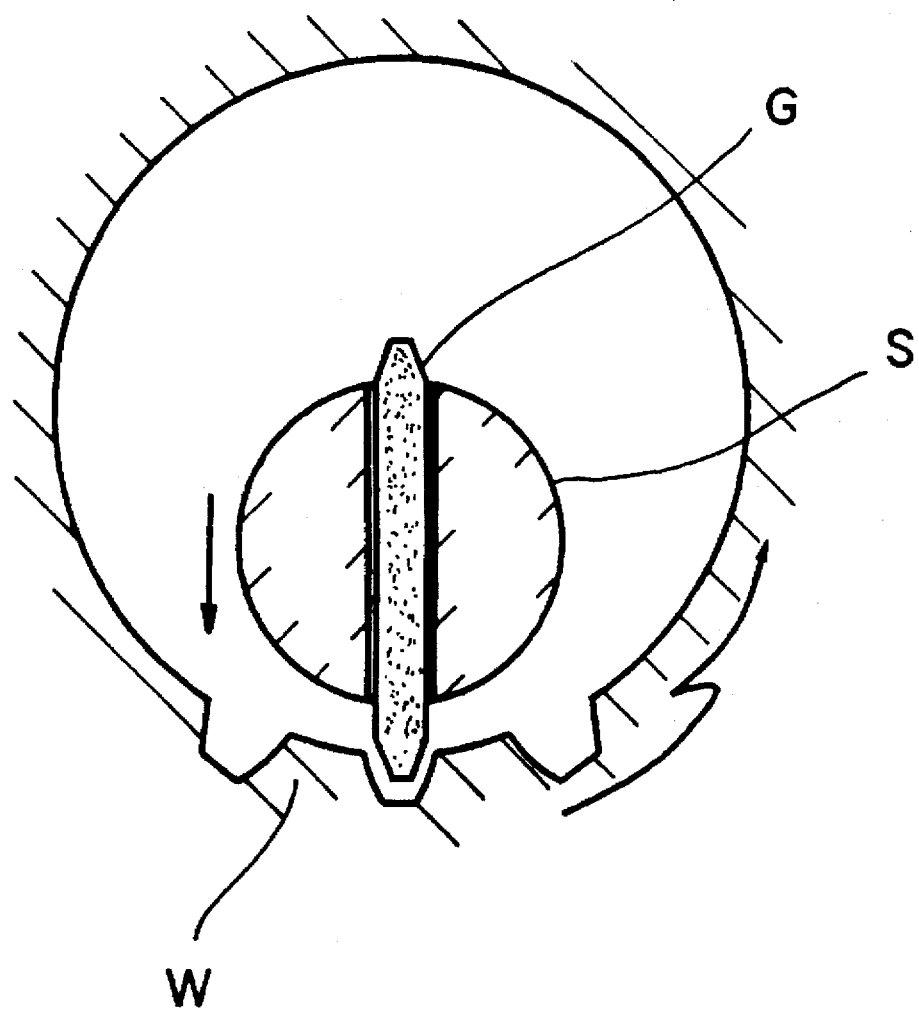
FIG. 9 is a sectional view showing a prior art finishing machine for internal spline tooth surfaces.

A finishing machine for internal spline tooth surfaces as a third preferred embodiment of the invention comprises a holding device 1 for holding a work having internal spline tooth surfaces as shown in FIGS. 6 and 7; a grinding stone 43 provided at the center portion of an axle rotatably supported at both ends thereof and having the tooth portions 431 for simultaneously processing the tooth portions in the work W; a vibrating device 6 for vibrating the grinding stone 43 with a high speed in the axial direction of the work, and an expanding mechanism 7 for expanding outwardly the tooth portions 431 in the grinding stone 43 in a radial direction thereof by descending a wedge type member 71 with the aid of a hydraulic cylinder.

A finishing machine for internal spline tooth surfaces comprised by the above-mentioned constitution as a third preferred embodiment is designed to operate by simultaneously processing the tooth portions in the work having internal spline tooth surfaces held by the holding device 1 by means of the tooth portions 431 in the grinding stone 43 vibrated with a high speed in the axial direction of the work W by the vibrating device 6 and also expanded to be pressed outward in a radial direction thereof by the expanding mechanism 7.

A finishing machine for internal spline tooth surfaces of the third preferred embodiment having the operation described above has the effect of making it possible to finish the internal spline tooth surfaces effectively, since the tooth portions in the grinding stone 43 are expanded outward in a radial direction thereof by the expanding mechanism 7.

A finishing machine for internal spline tooth surfaces of the third preferred embodiment has also the effect of making a structure thereof simple and a device thereof inexpensive, since the rotating and driving device in the braking device 2 and the rotating and driving device 5 for rotating and driving the grinding stone are not required as shown in the first and second preferred embodiments.

It should be understood that the specific embodiments of the invention described herein have been intended as an illustrative for explanation and not limited in scope by them, and any modification and addition may be possible so far as they may be against the technical idea of the invention recognizable by those skilled in the art from the scope for patent claims, detailed description of the invention and brief description of the drawings.

It is possible to realize that the apparatus illustrated in the first preferred embodiment may be used in the first through third preferred embodiments corresponding to the kinds of the work W by switching sequentially depending on the presence or absence of rotation and drive, the kinds of the grinding stone and the presence or absence of the work rotation.

What we claim is:

1. A finishing machine for internal spline tooth surfaces comprising;

a holding device for holding a work having internal spline tooth surfaces;

a grinding stone having a plurality of tooth portions for simultaneously grinding the internal spline tooth surfaces of said work, the grinding stone having an axial length and an outer diameter, the axial length being greater than the outer diameter of said grinding stone;

a rotating device operatively associated with the grinding stone for rotating the grinding stone in a forward rotating direction and a reverse rotating direction;

a rotation direction control device for controlling the rotating direction of the grinding stone to change rotation of the grinding stone between the forward rotating direction and the reverse rotating direction; and a vibrating device for vibrating said grinding stone up and down with a long stroke in an axial direction of said work to grind an entire axial length the internal spline tooth surfaces of the work in each up and down stroke of the grinding stone.

2. A finishing machine for internal spline tooth surfaces according to claim 1, further comprising:

an expanding mechanism for outwardly expanding said tooth portions in said grinding stone in a radial direction thereof, the expanding mechanism including a wedge shaped element.

3. A finishing machine for internal spline tooth surfaces according to claim 1, further comprising:

a braking device for braking the work with a brake force.

4. A finishing machine for internal spline tooth surface according to claim 1, further comprising:

a work pressing device for pressing the work onto said grinding stone.

5. A finishing machine for internal spline tooth surfaces according to claim 1, wherein said grinding stone has an axial length with respect to up and down movement thereof and a constant outer diameter over the axial length thereof.

6. A finishing machine for internal spline tooth surfaces according to claim 1, wherein said grinding stone is mounted on an axle that is connected to the rotating device by way of a universal joint.

7. A finishing machine for internal spline tooth surfaces according to claim 1, including an electromagnetic brake for braking the work.

8. A finishing machine for internal spline tooth surfaces according to claim 1, wherein said grinding stone is provided at a center portion of an axle that is rotatably supported at both ends.

9. A finishing machine for internal spline tooth surfaces according to claim 1, wherein said vibrating device comprises an up and down control device for controlling said grinding stone up and down by switching over a hydraulic pressure supplied into a hydraulic cylinder.

10. A finishing machine for internal spline tooth surfaces according to claim 9, wherein said up and down control device comprises a piston cylinder which includes a piston inserted into a hydraulic cylinder and connected to said grinding stone, and which is controlled by switching a hydraulic pressure supplied into said hydraulic cylinder.

* * * * *